(12) United States Patent
Kozhukh et al.

(10) Patent No.: US 7,006,233 B2
(45) Date of Patent: Feb. 28, 2006

(54) METHOD OF DETECTING A DISTORTION ON A SURFACE

(75) Inventors: Michael Kozhukh, Palo Alto, CA (US); Kenneth E. Salsman, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 10/341,764

(22) Filed: Jan. 13, 2003
(Under 37 CFR 1.47)

(65) Prior Publication Data

US 2004/0136009 A1 Jul. 15, 2004

(51) Int. Cl.
*G01B 9/02* (2006.01)

(52) U.S. Cl. .................... 356/491; 356/601; 356/239.7

(58) Field of Classification Search ................ 356/495, 356/493, 492, 491, 511, 516, 503, 450, 601, 356/237.1, 239.7, 239.8
See application file for complete search history.

(56) References Cited

U.S. PATENT DOCUMENTS 6,576,195 B1 * 6/2003 Eppes ...................... 422/82.05
6,724,215 B1 * 4/2004 Kuroiwa ..................... 324/770

* cited by examiner

*Primary Examiner*—HWA (Andrew) Lee
(74) *Attorney, Agent, or Firm*—Blakely, Sokoloff, Taylor & Zafman LLP

(57) ABSTRACT

A method of detecting a distortion on a surface is described. A layer of liquid crystal material is formed on the surface with molecules of the material aligned in planes parallel to the surface. The molecules in each select plane have axes aligned with one another. A phase shift of electromagnetic radiation is detected. The phase shift is due to a distortion in the alignment of the molecules out of a select plane in a region of and due to the distortion on the surface.

21 Claims, 4 Drawing Sheets

METHOD OF DETECTING A DISTORTION ON A SURFACE

BACKGROUND OF THE INVENTION

1). Field of the Invention

This invention relates to a method of detecting a distortion on a surface.

2). Discussion of Related Art

It is often required that small surfaces, for example, metal electrodes that are used in LCD displays or tiny mirrors that are used for reflecting light, be manufactured to be almost entirely flat. Scanning electron and other microscopes are usually used to view these surfaces in order to determine whether they are planar. Distortions come out from these surfaces in a direction of optics of such microscopes, making it difficult to view and therefore detect these distortions when picturing the surfaces face-on.

BRIEF DESCRIPTION OF THE DRAWINGS

The invention is described by way of example with reference to the accompanying drawings, wherein.

DETAILED DESCRIPTION OF THE INVENTION

Figure 1:
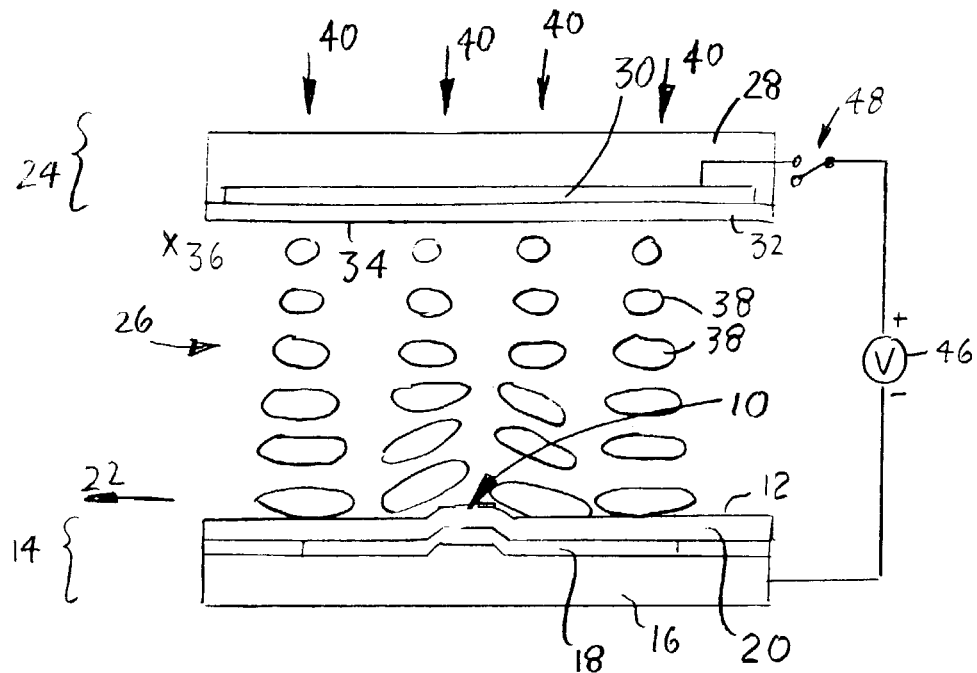
FIG. 1 is a cross-sectional side view through a setup which is used for detecting a distortion on a surface before a voltage is applied to a liquid crystal material of the setup.

FIG. 1 of the accompanying drawings illustrates an initial setup for detecting a distortion 10 on a surface 12.

In the present example, the surface 12 is a surface of a microelectronic die 14. The microelectronic die 14 includes a silicon backplane 16, a metal electrode 18 formed on the silicon backplane 16, and a polyimide layer 20. The polyimide layer 20 is transparent, so that light (electromagnetic radiation) can radiate from the top therethrough and be reflected by the metal electrode 18 back through the polyimide layer 20.

The surface 12 of the microelectronic die 14 is formed by an upper surface of the polyimide layer 20 and the distortion 10 is a distortion formed on the upper surface 12. The distortion 10 is due to a distortion on an upper surface of the metal electrode 18 which, in turn, is due to a distortion on an upper surface of the silicon backplane 16. The location of the distortion 10 is directly above the location of the distortion of the metal electrode 18. A detection of the location of the distortion 10 would thus correlate to the location of the distortion on the upper surface of the metal electrode 18.

The bare upper surface 12 is rubbed in a direction 22. The effect of rubbing the upper surface 12 in the direction 22 is that an electrostatic field is created on the surface 12 which is oriented in the direction 22.

A transparent component 24 is located over the surface 12 and a liquid crystal material 26 is injected and held between the transparent component 24 and the surface 12.

The transparent component 24 includes a cover glass portion 28, a transparent electrode 30 formed on a lower surface of the cover glass portion 28, and a polyimide layer 32 formed on a lower surface of the transparent electrode 30. All the components 28, 30, and 32 are transparent, so that light can radiate entirely through the transparent component 24. The transparent electrode 30 may, for example, be a film which includes $In_2O_3$ and $SnO_2$.

Prior to positioning of the transparent component 24 in the position shown in FIG. 1, a lower surface 34 is rubbed in a direction 36. The direction 36 is indicated with an "X," representing a direction into the paper.

The liquid crystal material 26 has molecules 38 that are aligned in vertical stacks 40. The molecules 38 are also aligned in horizontal planes, wherein each plane includes one molecule from each respective stack 40. The liquid crystal material 26 is typically between 1 and 10 microns thick.

Figure 2:
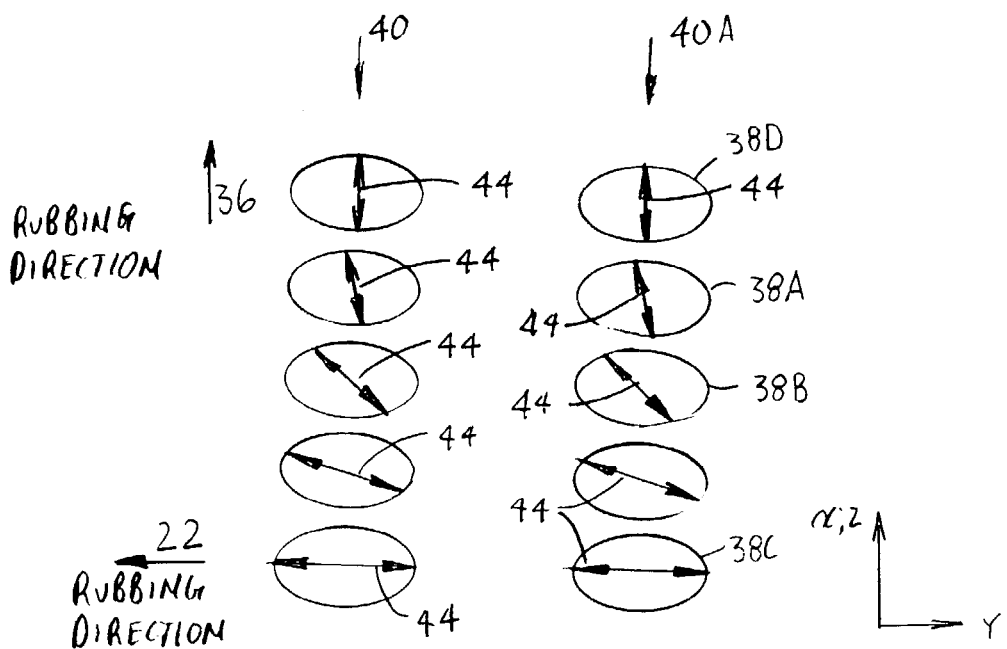
FIG. 2 is perspective view illustrating the directions of axes of molecules of the liquid crystal material.

FIG. 2 illustrates two of the stacks 40 in perspective view. Each molecule 38 has an axis of rotation 44. The axis 44 of each particular molecule 38A in a particular stack 40A is rotated about a center line of the particular stack 40A in a clockwise direction relative to the axis 44 of a molecule 38B in the particular stack 40A directly below the particular molecule 38A. The lowest molecule 38C in the particular stack 40A has an axis 44 aligned in the rubbing direction 22, and the upper molecule 38D in the particular stack 40A has an axis 44 aligned in the rubbing direction 36. By rubbing the surfaces 12 and 34 in the directions 22 and 36, the rotational positioning of the axes 44 in a particular stack 40 can be controlled, and uniformity from one stack to another is ensured.

Referring again to FIG. 1, it can be seen that the molecules 38 directly on the surface 12 are distorted slightly out of plane in the region of and due to the distortion 10. These distortions have little effect on light that propagates through the molecules 38 before a voltage is applied over the liquid crystal material 26. As is further illustrated, a voltage source 46 is connected through a switch 48 over the transparent electrode 30 and the microelectronic die 14. The switch 48 is in an open position, so that no voltage potential is created over the liquid crystal material 26.

Figure 3:
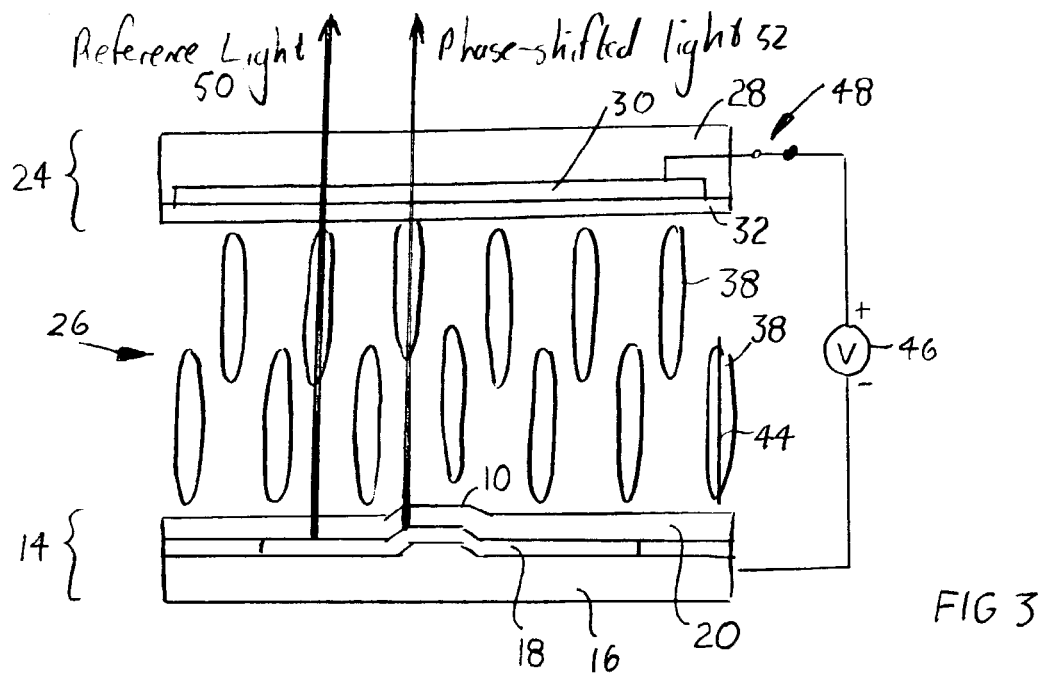
FIG. 3 is a view similar to FIG. 1 after a voltage is applied over the liquid crystal material.

FIG. 3 illustrates the setup of FIG. 1 after the switch 48 is closed, so that the voltage source 46 applies a voltage over the liquid crystal material 26. The molecules 38 reorient themselves so that their axes 44 rotate from horizontal to vertical. The molecules 38 are still in horizontal planes, except for a distortion in these horizontal planes in a region of and due to the distortion 10.

In use, light is radiated downward through the transparent component, the liquid crystal material 26, and the polyamide layer 20, and reflected from an upper surface of the metal electrode 18. The reflected light radiates through the liquid crystal material 26 and the transparent component 24. Light reflected from surfaces of the metal electrode 18 distant from the distortion thereof is referred to as "reference light 50." All the reference light 50 has the same phase and amplitude, so that virtually no interference occurs between adjacent beams of the reference light 50. Light reflected from the distortion of the metal electrode 18 is referred to as "phase-shifted light 52." The phase-shifted light 52 has a different phase relative to the reference light 50. The different phase of the phase-shifted light 52 is due to the distortion of the molecules 38 out of horizontal planes near the distortion 10. The phase-shifted light 52 interferes with the reference light 50 to create an interference pattern that can be viewed by an observer.

Figure 4:
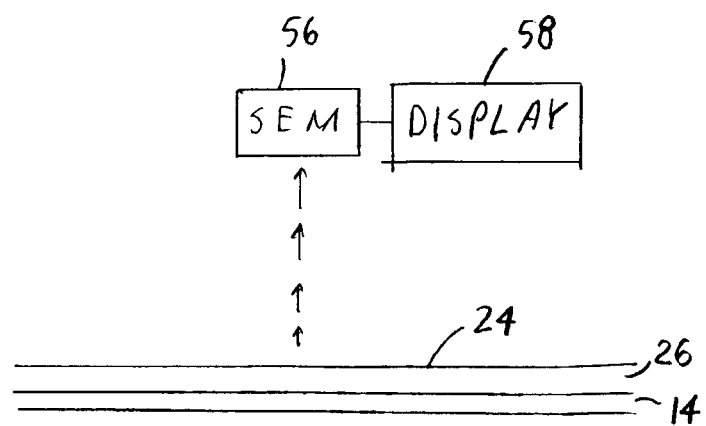
FIG. 4 is a side view illustrating the setup of FIG. 3 and additional components including a scanning electron microscope and a display.

FIG. 4 illustrates further components of the setup of FIG. 3, including a scanning electron microscope (SEM) 56 and a display 58. The light radiating through the liquid crystal material 26 and transparent component 24 is received by the SEM 56 and can then be viewed by a viewer on the display 58.

Figure 5:
FIG. 5 is a top plan view illustrating an array of metal electrodes, wherein a distortion on each metal electrode can be viewed.
Figure 6:
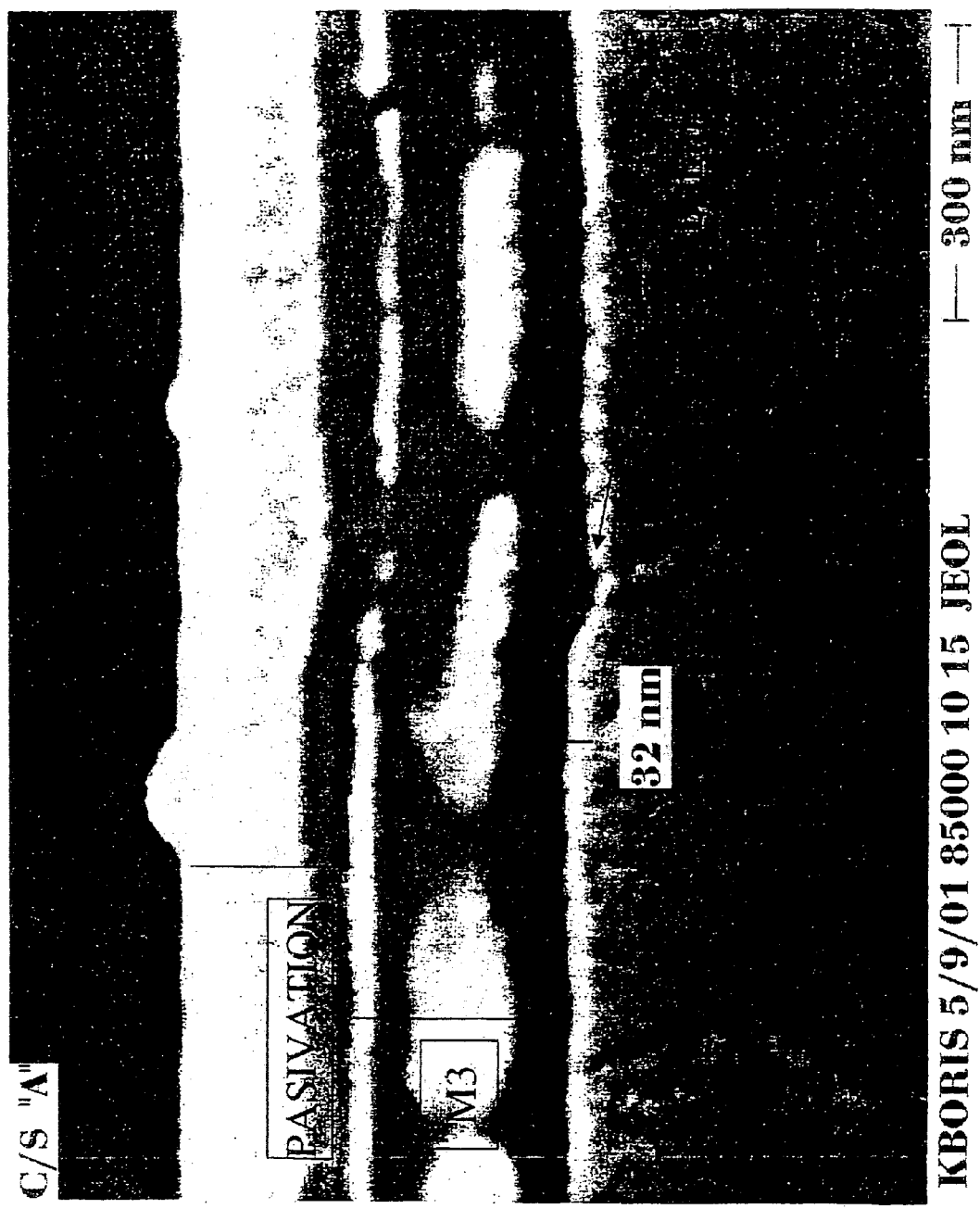
FIG. 6 is a top plan view illustrating a portion of FIG. 5 in enlarged detail.

FIGS. 5 and 6 illustrate the detail that can be viewed with the setup of FIG. 3. FIG. 5 illustrates a number of metal electrodes, each metal electrode having a U-shaped distortion that can be seen with greater detail utilizing a liquid crystal material-based setup as in FIG. 3. As illustrated in FIG. 6, the distortions are less than 40 nm wide, and that some distortions as small as 32 nm can be clearly viewed.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of detecting a distortion on a surface, comprising:
   forming a layer of liquid crystal material on the surface, with molecules of the material aligned in planes parallel to the surface, in each select plane the molecules having axes aligned with one another;
   applying a voltage over the liquid crystal material; and
   detecting a phase shift of electromagnetic radiation due to a distortion in the alignment of the molecules out of a select plane in a region of and due to the distortion on the surface.

2. The method of claim 1, wherein the molecules are in the form of stacks on the surface, in each stack the axes of the molecules being consecutively rotated about a center line of the stack.

3. The method of claim 2, further comprising:
   rubbing the surface in a first selected direction;
   rubbing a transparent member in a second selected direction, the liquid crystal material being held between the surface and the transparent member with the second selected direction being at an angle relative to the first selected direction so that the axes of the molecules are consecutively rotated.

4. The method of claim 1, wherein the voltage is applied over a thickness of the liquid crystal material.

5. The method of claim 4, further comprising:
   holding the material between the surface and a transparent member.

6. The method of claim 5, wherein the voltage is applied to an electrically conductive transparent film formed on the transparent material.

7. The method of claim 6, wherein the film includes $In_2O_3$ and $SnO_2$.

8. The method of claim 1, wherein the layer is between 1 and 10 microns thick.

9. The method of claim 5, wherein the surface is a surface of a terminal on a microelectronic die.

10. The method of claim 5, wherein the distortion is less than 40 nm wide.

11. The method of claim 1, wherein the distortion is a distortion in alignment of the molecules out of a plane parallel to the surface.

12. The method of claim 1, further comprising:
    rubbing in a selected direction across the surface before applying the liquid crystal material on the surface.

13. The method of claim 1, wherein the phase shift is detected by viewing the surface through the liquid crystal material and a microscope.

14. The method of claim 1 wherein the phase shift is detected in a view perpendicular to the surface.

15. The method of claim 1 wherein the distortion is the same material as the surface.

16. The method of claim 1 wherein the distortion is above the surface.

17. The method of claim 1 wherein the distortion is below the surface.

18. A method of detecting a distortion on a surface, comprising:
    applying a layer of a liquid crystal material on the surface;
    applying a voltage over the liquid crystal material to create an alignment of molecules of the liquid crystal material with a distortion of the alignment due to and in a region of the distortion of the surface; and
    detecting a phase shift of electromagnetic radiation due to the distortion of the alignment.

19. The method of claim 18, wherein the voltage is applied over a thickness of the layer.

20. The method of claim 19, further comprising:
    positioning a transparent member over the liquid crystal material, the voltage being applied to the transparent member relative to the surface.

21. A method of detecting a distortion on a surface, comprising:
    rubbing in a selected direction across the surface;
    applying a layer of a liquid crystal material to the surface, molecules of the liquid crystal material being aligned in a common direction due to the surface being rubbed in the selected direction;
    positioning a transparent member over the liquid crystal material;
    applying a voltage to the transparent member relative to the surface, the voltage creating a change in the alignment of the molecules while still being uniformly aligned with one another in a plane parallel to the surface except for a distortion in the alignment out of the plane due to and in a region of the distortion on the surface;
    radiating electromagnetic radiation through the layer; and
    detecting a phase shift of the electromagnetic radiation due to the distortion in the alignment.

* * * * *